United States Patent [19]
Votruba

[11] Patent Number: 6,138,972
[45] Date of Patent: *Oct. 31, 2000

[54] DOLLY SECURING BRACKET

[75] Inventor: Edward J. Votruba, Chandler, Ariz.

[73] Assignee: U-Haul International, Inc., Phoenix, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 08/943,886

[22] Filed: Oct. 3, 1997

[51] Int. Cl.[7] ...................................................... A47H 1/10
[52] U.S. Cl. ........................ 248/317; 248/552; 248/230.4
[58] Field of Search ...................................... 248/317, 214, 248/219.3, 218.4, 231.91, 251, 682, 500, 503, 316.6, 221.11, 552, 230.4, 230.1; 211/5

[56] References Cited

U.S. PATENT DOCUMENTS

| | | | |
|---|---|---|---|
| 576,769 | 2/1897 | Williams | 24/521 |
| 661,324 | 11/1900 | Rosenbluth et al. | 248/230.4 |
| 841,589 | 1/1907 | Simon | 248/251 |
| 1,285,218 | 11/1918 | Kershaw | 248/251 |
| 1,292,486 | 1/1919 | Kumler | 70/18 |
| 2,222,810 | 11/1940 | Daily | 248/228.1 |
| 2,792,581 | 5/1957 | Woyton | 15/144 |
| 3,138,260 | 6/1964 | Tedrick | 211/18 |
| 3,468,509 | 9/1969 | Foltz | 248/316 |
| 3,503,580 | 3/1970 | Levy | 248/62 |
| 3,934,436 | 1/1976 | Candlin et al. | 70/234 |
| 4,043,528 | 8/1977 | Benoit et al. | 248/251 |
| 4,098,423 | 7/1978 | Marrero | 220/3.6 |
| 4,139,100 | 2/1979 | Reed | 211/4 |
| 4,185,410 | 1/1980 | Kristiansen | 46/23 |
| 4,286,444 | 9/1981 | Grudich | 70/13 |
| 4,290,284 | 9/1981 | Nicksic | 70/233 |
| 5,184,608 | 2/1993 | Hale, IIII | 138/89 |
| 5,887,461 | 3/1999 | Heffley | 70/18 |

Primary Examiner—Anita M. King
Assistant Examiner—Kimberly Wood
Attorney, Agent, or Firm—Jeffer, Mangels, Butler & Marmaro LLP

[57] ABSTRACT

A bracket includes a lower hasp, an upper hasp, means for securing the upper hasp to the lower hasp and means for affixing the bracket to an object. At least one of the upper hasp and the lower hasp has defined therein a concave portion, and the means for securing the upper hasp to the lower hasp is disposed between the means for affixing the bracket to an object and the concave portion.

15 Claims, 6 Drawing Sheets

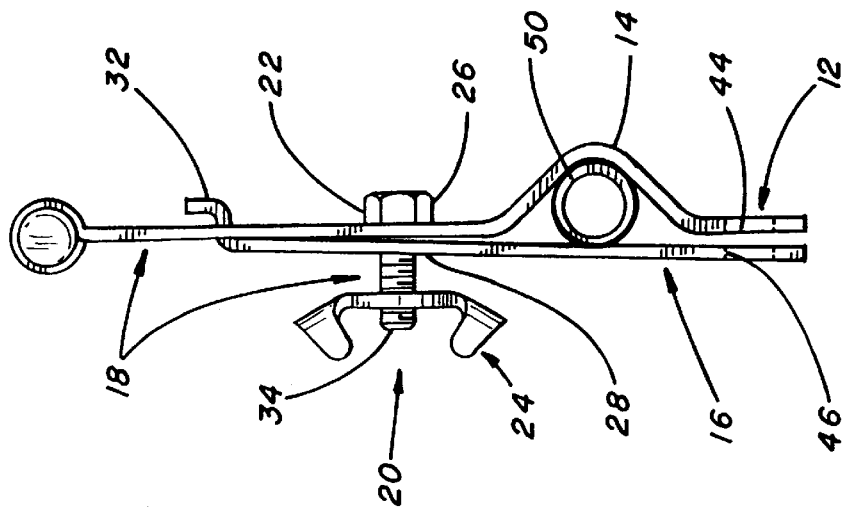
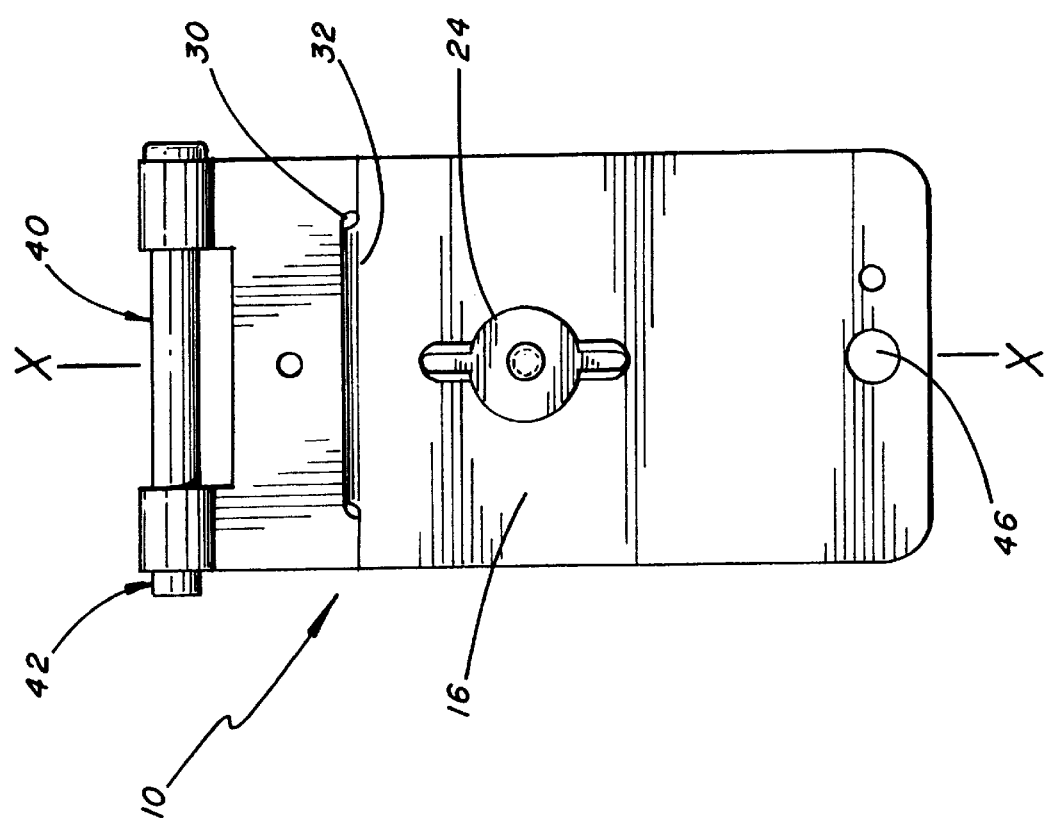

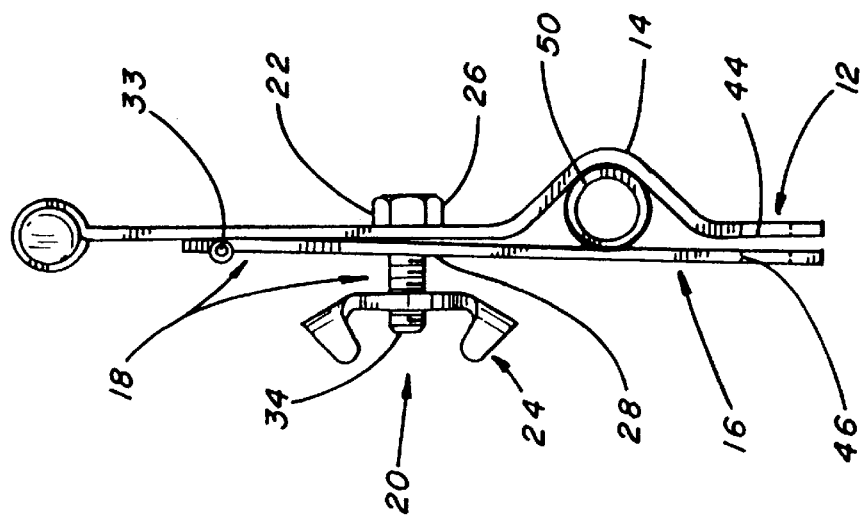
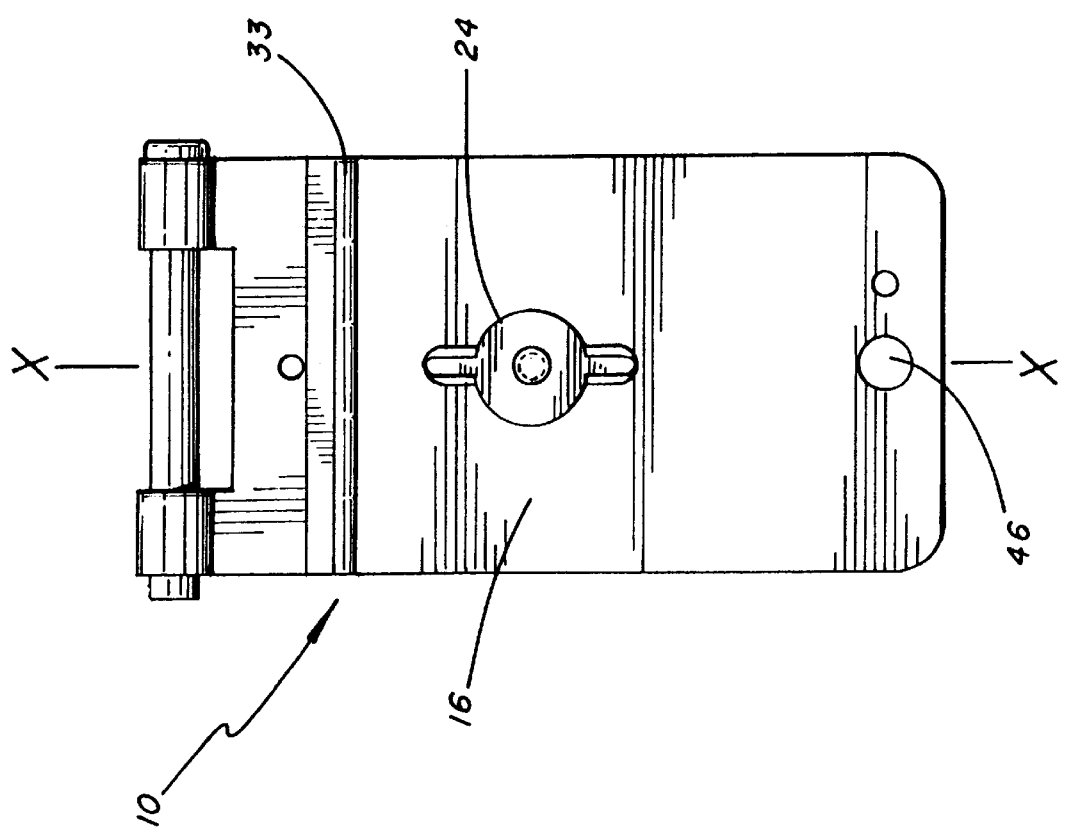
FIG. 8
FIG. 9

DOLLY SECURING BRACKET

FIELD OF THE INVENTION

The present invention relates to a bracket useful for securing an object, such as a dolly, to another object, such as a wall of a moving vehicle utility box or a vending device affixed within a moving vehicle.

BACKGROUND OF THE INVENTION

Objects transported in moving vehicles (e.g., moving vans) typically must be secured to prevent movement and possible damage during transport. In particular, wheeled objects such as dollies must be secured prior to transport.

Typically, objects are secured within moving vans or other vehicles by use of ropes, bungee cords or other flexible members. Use of such devices has not proven entirely satisfactory. For example, ropes and cords can become loosened during transport, allowing the secured object to move.

A need exists for a device useful to secure objects, in particular wheeled objects such as dollies, within moving vehicles.

SUMMARY OF THE PREFERRED EMBODIMENTS

In accordance with one aspect of the present invention, there is provided a bracket that includes a lower hasp, an upper hasp and means for securing the upper hasp to the lower hasp. At least one of the upper hasp and the lower hasp has defined therein a concave portion. The concave portion engages a portion of a dolly, such as an axle, or a portion of another object. When the upper and lower hasps are then secured in place, the dolly or other object is firmly gripped by the bracket.

According to a more specific embodiment of the invention, the lower hasp has defined therethrough a slot, and the means for securing the upper hasp to the lower hasp includes a tongue, preferably having a curved cross-section, engaged within the slot in the lower hasp, and a fastener disposed between the tongue and the concave portion.

In a first preferred embodiment, the lower hasp has defined therein the concave portion. Preferably, the concave portion extends transversely with respect to the longitudinal axis of the lower hasp.

In a second preferred embodiment, the upper hasp has defined therein the concave portion.

In a third preferred embodiment, both the upper and the lower hasps have defined therein respective concave portions. The two concave portions extend parallel to each other.

According to another more specific embodiment, the upper and lower hasps have defined therethrough aligned openings between the tongue and the concave portion(s). These aligned openings receive the fastener, which preferably includes a threaded bolt and a nut engaging the bolt. More preferably, the threaded bolt has an end which includes a tack weld to prevent removal of the nut.

In a further more specific embodiment, the bracket further includes means for affixing the bracket to an object, for example an interior wall of a moving vehicle utility box via a wall bracket affixed to the wall. More particularly, the means for affixing the bracket to the object include at least one hollow element and a pin that registers within the hollow element.

In still another more specific embodiment, the upper and lower hasps have defined therethrough at least one pair of aligned holes for receiving a sealing device, such as an access-detectable seal or an access-controllable seal.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIGS. 1–2 are top plan and side elevational views, respectively, of a first preferred embodiment of the inventive bracket in which the concave portion is defined in the lower hasp, FIGS. 8–9 are top plan and side elevational views of an alternative embodiment of a bracket of the invention including a hinge and FIG. 10 is a top perspective view of an embodiment of the invention securing a dolly within a moving vehicle utility box.

Like numerals refer to like parts throughout the several views of the drawings.

DETAILED DESCRIPTION OF THE PREFERRED EMBODIMENTS

Figure 4:
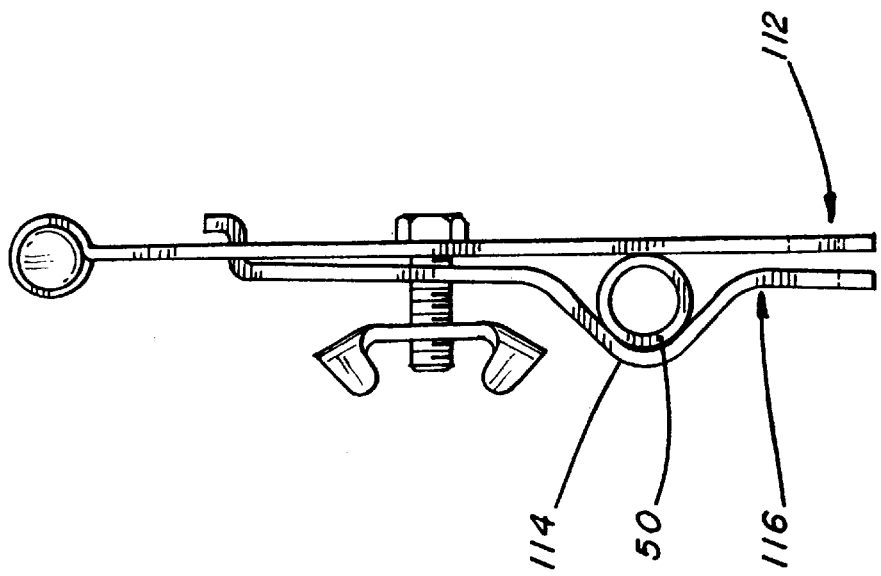
FIGS. 3–4 are top plan and side elevational views, respectively, of a second preferred embodiment of the inventive bracket in which the concave portion is defined in the upper hasp.

The bracket according to the instant invention is useful in a wide range of applications. For example, the inventive bracket can be used in a moving vehicle such as a moving van, alone or together with additional devices. In particular, the inventive bracket can be used in conjunction with one or more vending devices as described in copending, commonly assigned application Ser. No. 08/696,722, the disclosure of which is incorporated in its entirety herein by reference.

Referring now to the figures, in FIGS. 1–2 bracket 10 includes lower hasp 12 having defined therein concave portion 14. Upper hasp 16 is secured to lower hasp 12 by securing means 18. In the illustrated embodiment, securing means 18 include fastener 20 comprising threaded bolt 22 and nut 24, for example a wing nut. Threaded bolt 22 is disposed within aligned openings 26 and 28 defined through lower hasp 12 and upper hasp 16, respectively. Fasteners 20 other than the means illustrated herein can also be employed. For example, the fastener can include an unthreaded bolt and a pin which is received within an opening defined through the bolt. Additional useful fasteners will be readily apparent to those skilled in the art.

Preferably, the concave portion 14 defined in lower hasp 12 extends transversely with respect to longitudinal axis X of lower hasp 12. The concave portion 14 can have any desired cross-sectional configuration, for example the right-angled cross-section illustrated herein. Other useful cross-sectional configurations include semi-circular, elliptical, polygonal, etc. Selection of a particular cross-sectional configuration will depend on factors such as the configuration of the object or element thereof, such as an axle or another member of a dolly, which is to be secured by the inventive bracket. As illustrated, concave portion 14 extends in a substantially straight line in the transverse direction. If desired, concave portion 14 can be curved in two or three dimensions, in order to have a configuration appropriate to the object to be secured by the inventive bracket.

A slot 30 is defined through lower hasp 12. Tongue 32 of upper hasp 16 engages within slot 30. As illustrated, tongue 32 preferably has a curved cross-section in order to facilitate pivotal motion of upper hasp 16 relative to lower hasp 12 to permit engagement of the object to be secured by bracket 10 between the upper and lower hasps and within concave portion 14. Tongue 32 together with threaded bolt 22 and nut 24 comprise an embodiment of securing means 18 for securing lower hasp 12 and upper hasp 16 together.

Slot 30 and tongue 32 can be replaced by, for example, a hinge 33 connecting lower hasp 12 and upper hasp 16, as shown in FIGS. 8–9, or by other means that permit motion of upper hasp 16 about a transverse axis with respect to lower hasp 12.

In the preferred embodiment of FIGS. 1–2, threaded bolt 20 further includes a tack weld 34 which is added after nut 24 is threaded onto bolt 20. Tack weld 34 prevents removal of nut 24 and therefore prevents complete removal of the upper hasp.

Preferably the inventive bracket includes means for affixing the bracket to another object, in particular to a surface such as an interior wall of a moving vehicle utility box. See FIG. 7. In one particularly preferred embodiment, the inventive bracket includes a pair of tubular elements 38 in spaced relationship. Clevis pin 40 registers within tubular elements 38 and is secured in place by spring pin 42. Other useful affixing means, for example a hinged plate with openings defined therethrough for bolting or screwing into place, clamping devices, etc., will be readily apparent to those skilled in the art.

In a preferred embodiment, lower hasp 12 and upper hasp 16 have defined therein aligned holes 44, 46, preferably at their lower ends as illustrated. Holes 44, 46 receive a sealing device. Useful sealing devices include access-detectable seals and access-controllable seals.

An "access-detectable seal" can comprise any material which can be affixed to lower hasp 12 and upper hasp 16 via aligned holes 44, 46 such that separation of the lower and upper hasps in order to access the object secured by bracket 10 will sever or deform the seal to the extent that such access is detectable. Thereby, access to the secured object can be detected. The access-detectable seal can be relatively rigid or flexible. In preferred embodiments human hands, scissors, pliers, wire cutters and the like can be used to sever or deform the access-detectable seal.

The access-detectable seal can comprise a sealed band affixed to bracket 10 as described above, whereby access to the secured object requires severing or deforming the sealed band. The sealed band can be formed of materials, including without limitation, metal, plastic, paper, leather, rubber, wood, wax or combinations thereof. The sealed band is preferably formed such that its severance or deformation is readily noticeable and not easily reversible. In one embodiment, substitution of the sealed band can be made difficult by use of specially printed, embossed or otherwise identifiable materials not readily available to a user of the vending device.

An "access-controllable seal" is a device which restricts access to the secured object through separation of lower hasp 12 and upper hasp 16. The access-controllable seal is typically, but not necessarily reusable. The access-controllable seal is designed to prevent access to object secured by bracket 10 without the use of a specially designed implement which allows such access. Access to the secured object, sealed within bracket 10 by an access-controllable seal, is not designed to occur through use of ordinary tools, such as human hands, scissors, pliers and the like. The access-controllable seal can comprise a locking means requiring use of an unlocking means to allow access to the secured object. For example, the locking means can comprise a key lock and the unlocking means can comprise a key. The locking means can comprise a combination lock and the unlocking means can comprise a combination to the combination lock. Alternatively, the locking means can comprise a locking mechanism and the unlocking means can comprise United States coins and/or currency. In another embodiment, the locking means can comprise a locking mechanism and the unlocking means can comprise a token. In yet another embodiment the locking means can comprise a locking mechanism and the unlocking means can comprise a magnetic strip card key.

In use, an object to be secured by bracket 10, such as a dolly, is positioned such that at least a portion of the object, such as an axle 50 of the aforementioned dolly, is disposed within concave portion 14 of lower hasp 12. Upper hasp 16 is secured in place by tightening nut 24 on threaded bolt 22. Bracket 10 thus firmly grips the object to be secured.

Figure 3:
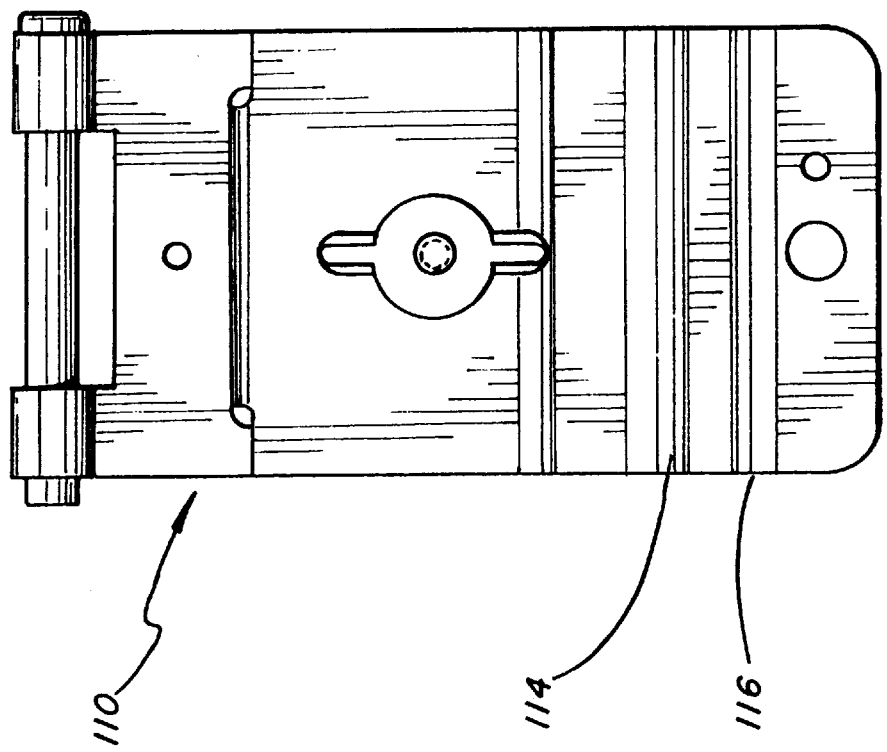

An alternative embodiment of the inventive bracket is illustrated in FIGS. 3–4. Bracket 110 includes lower hasp 112. Concave portion 114 is defined in upper hasp 116 in this embodiment, rather than in the lower hasp as with the previous embodiment.

Figure 6:
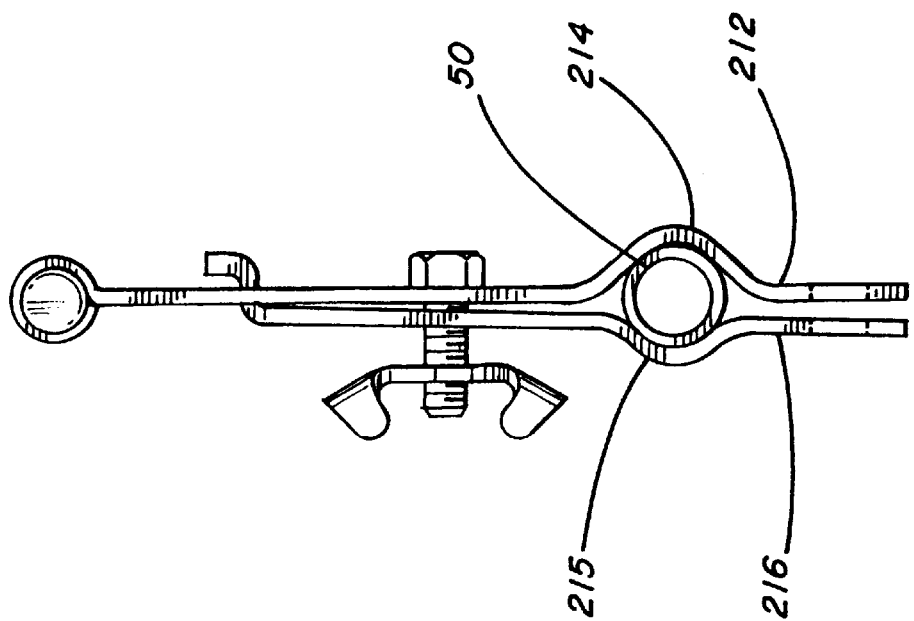
FIGS. 5–6 are top plan and side elevational views, respectively, of a third preferred embodiment of the inventive bracket in which parallel concave portions are defined in both the upper hasp and the lower hasp.
Figure 5:
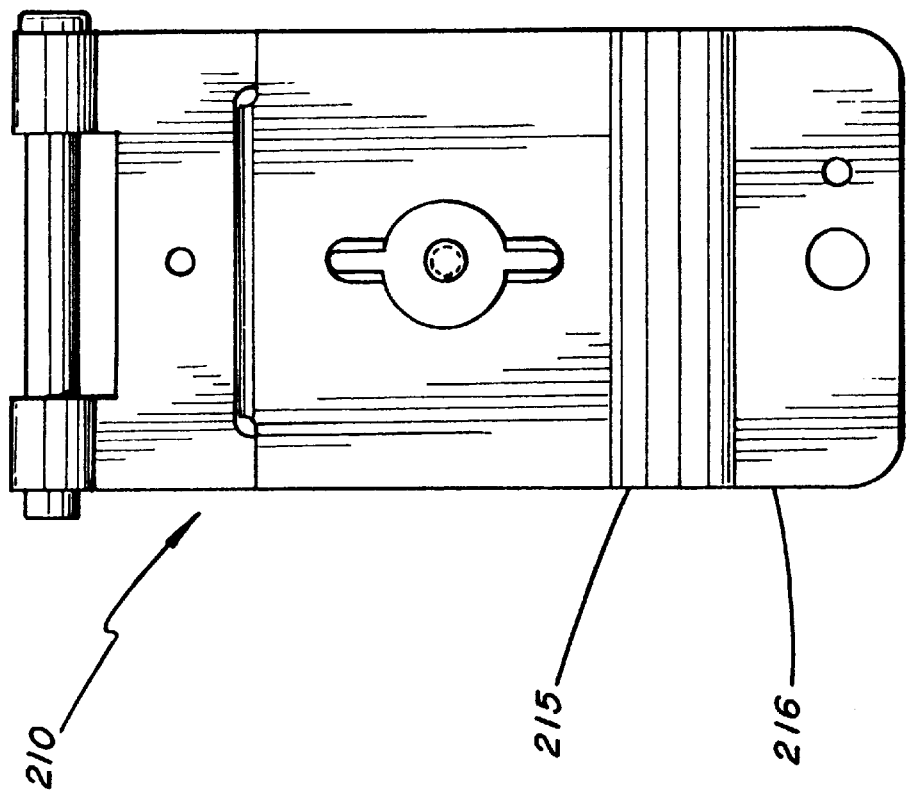

According to another alternative embodiment, illustrated in FIGS. 5–6, bracket 210 includes lower hasp 212 in which lower concave portion 214 is defined. A second, upper concave portion 215 is defined in upper hasp 216. The lower and upper concave portions in this embodiment can be shallower than the concave portions of the previous embodiments, or alternatively, can have the same depth as the concave portions of the previous embodiments in order to secure portions of objects having larger diameters.

Figure 7:
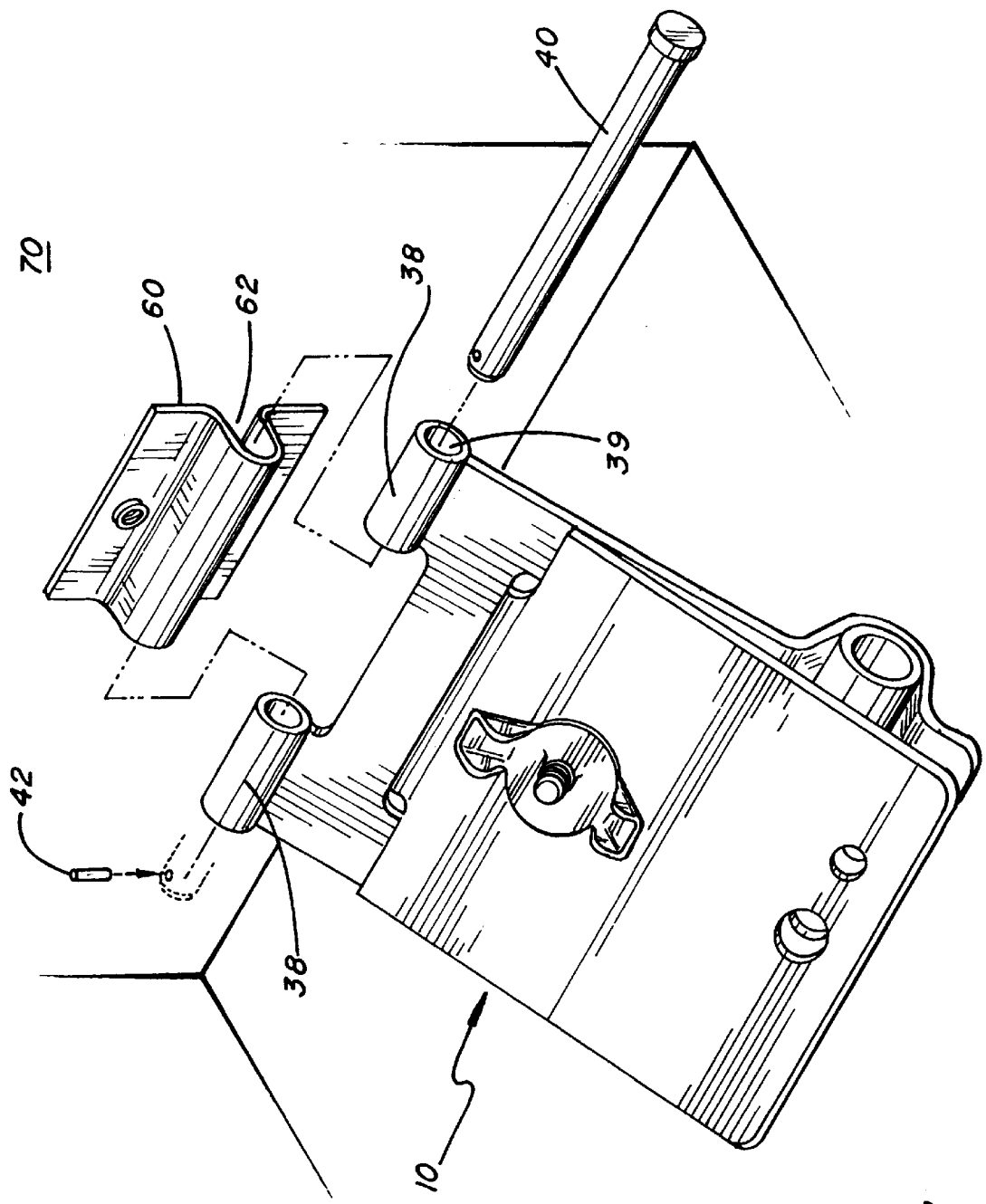
FIG. 7 is an exploded perspective view of an embodiment of a bracket according to the invention in relation to a bracket affixed to a wall of a moving vehicle utility box.

An exemplary use of an embodiment of the inventive bracket is illustrated in FIG. 7. Paired elements 38 are aligned with a wall bracket 60 affixed to a wall 70 of a moving vehicle utility box such that the wall bracket 60 fits between the paired elements 38, positioning the opening 62 in wall bracket 60 in alignment with openings 39 in paired elements 38. Clevis pin 40 registers within aligned openings 39 and 62, thereby securing bracket 10 to wall 70. Spring pin 42 then secures clevis pin 40 in place.

Figure 10:
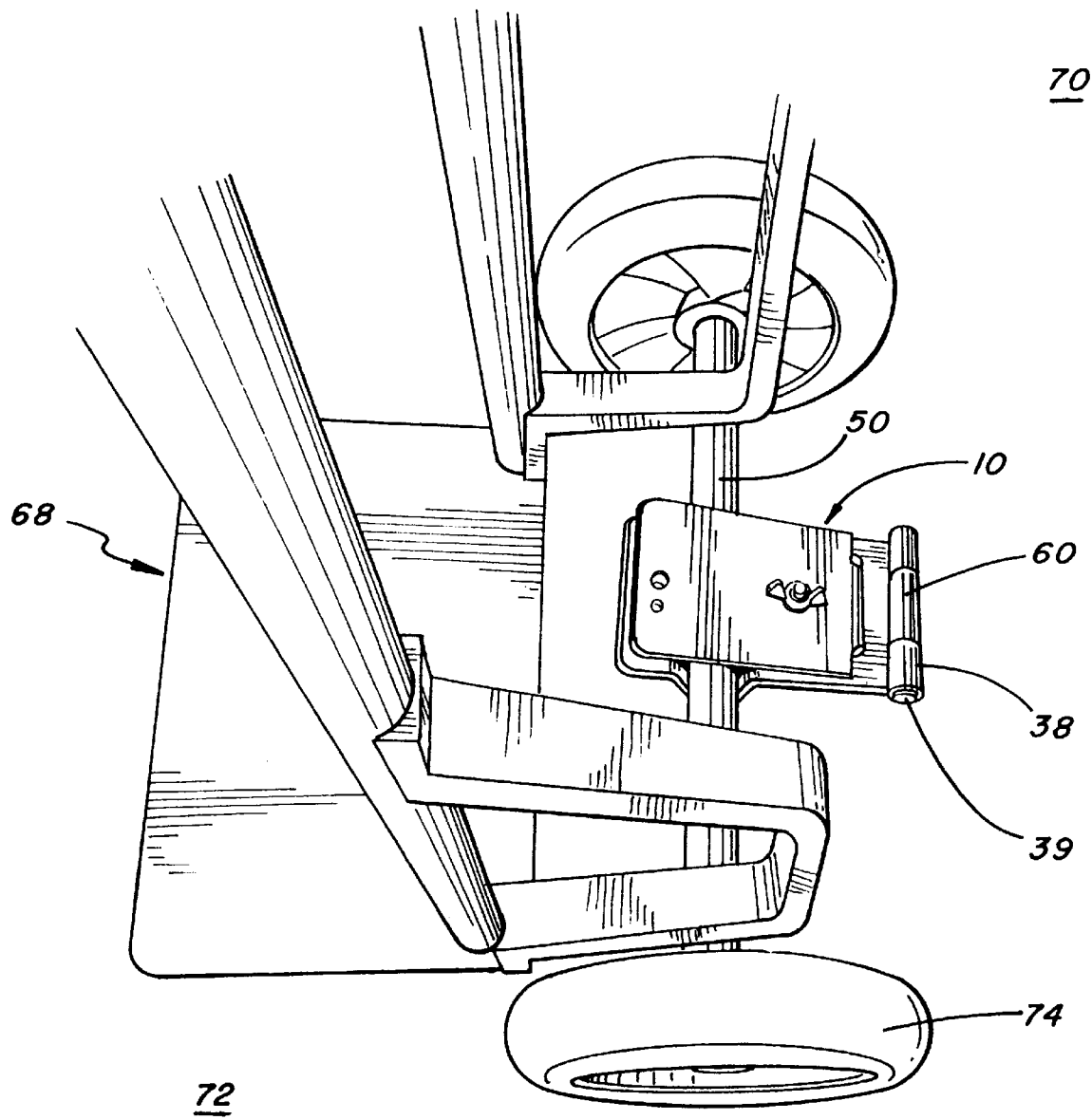

In the foregoing preferred embodiment, bracket 10 is free to pivot about an axis defined by clevis pin 40. Bracket 10 and wall bracket 60 thus form a hinge-like structure. When bracket 10 is used to secure a dolly 68 as described herein, the free motion of the bracket 10 insures that the dolly wheels 74 remain in firm contact with the deck 72 of the utility box (see FIG. 10) and allows compensation for variations in axle height, wheel size or other variables that affect the relative position of the axle of the dolly. Additionally, when not in use, the bracket 10 rotates downward against wall 70, thereby reducing encroachment of the bracket into the storage volume within the utility box.

The size of the bracket according to the invention, and the position of the concavity or concavities, can be selected to optimize the position of the dolly or other object secured by the bracket with respect to the utility box wall or other object to which the bracket itself is secured. In the example of FIG. 7, the bracket size and concavity position can be selected in order to ensure that a dolly secured by the bracket is held in close proximity to wall 70, thus further limiting possible movement of the dolly during transport.

If desired, bracket 10 can also be secured to wall 70 using rigid means rather than movable means. For example, rather than using paired elements 38, clevis pin 40 and bracket 60, a bracket according to the invention could include a tongue which engages a corresponding slot defined in the wall of a moving vehicle utility box. Other securing means will be obvious to those skilled in the art.

What is claimed is:

1. A bracket comprising a lower hasp having a slot defined therein, an upper hasp, means for securing said upper hasp to said lower hasp, and means for affixing said bracket to an object, wherein at least one of said upper hasp and said lower hasp has defined therein a concave portion, wherein said means for securing said upper hasp to said lower hasp includes a tongue engaged within said slot in said lower hasp, and a fastener disposed between said tongue and said concave portion, said fastener being independent of said means for affixing said bracket to an object, and wherein said upper hasp and said lower hasp have defined therethrough at least one pair of aligned holes for receiving a sealing device, said pair of aligned holes being remote from said fastener and said means for affixing said bracket to an object.

2. The bracket of claim 1 wherein said tongue has a curved cross-section.

3. The bracket of claim 1 wherein said lower hasp has defined therein said concave portion.

4. The bracket of claim 3 wherein said lower hasp has a longitudinal axis and said concave portion extends transversely of said longitudinal axis.

5. The bracket of claim 1 wherein said upper hasp has defined therein said concave portion.

6. The bracket of claim 5 wherein said upper hasp has a longitudinal axis and said concave portion extends transversely of said longitudinal axis.

7. The bracket of claim 1 wherein both said lower hasp and said upper hasp have defined therein a concave portion.

8. The bracket of claim 7 wherein said upper and lower hasps have respective longitudinal axes and said concave portions extends transversely of said respective longitudinal axes and parallel to each other.

9. The bracket of claim 2 wherein said upper hasp and said lower hasp have defined therethrough aligned openings between said tongue and said concave portion.

10. The bracket of claim 9 wherein said fastener comprises a threaded bolt disposed within said aligned openings and a nut engaging said bolt.

11. The bracket of claim 10 wherein said threaded bolt has an end comprising a tack weld.

12. The bracket of claim 1 wherein said means for affixing said bracket to an object comprises at least one hollow element and a pin that registers within said hollow element.

13. A bracket for securing a device having a bar to an inside wall of a utility box of a moving vehicle, said bracket comprising a lower hasp having a slot defined therein, an upper hasp having a tongue engaged within said slot in said lower hasp, a connector for affixing said bracket to said inside wall and a fastener, wherein at least one of said upper hasp and said lower hasp has defined therein a concave portion, wherein said fastener is disposed between said connector for affixing said bracket to said inside wall and said concave portion, and wherein said upper hasp and said lower hasp have defined therethrough at least one pair of aligned holes for receiving a sealing device, said pair of aligned holes being remote from said fastener and said connector, said upper and lower hasps when fastened together securing said bar within said concave portion and adjacent said inside wall.

14. The bracket of claim 1 wherein said lower hasp has a longitudinal axis, said means for securing said upper hasp to said lower hasp comprises means for permitting motion of said upper hasp about a transverse axis with respect to said lower hasp, and said longitudinal axis extends through said means for permitting motion of said upper hasp about a transverse axis with respect to said lower hasp.

15. The bracket of claim 1 wherein said upper hasp and said lower hasp each have opposite ends, and wherein said concave portion is defined between said opposite ends of said upper or said lower hasp.

* * * * *